United States Patent
Yamanaka

(10) Patent No.: US 7,088,724 B2
(45) Date of Patent: Aug. 8, 2006

(54) COMMUNICATION SYSTEM INTERFACING CONTROL OF QUALITY OF SERVICE (QOS) OF ASYNCHRONOUS TRANSFER MODE (ATM) AND INTERNET PROTOCOL (IP)

(75) Inventor: Masayuki Yamanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1059 days.

(21) Appl. No.: 10/106,996

(22) Filed: Mar. 26, 2002

(65) Prior Publication Data

US 2003/0081613 A1    May 1, 2003

(30) Foreign Application Priority Data

Oct. 31, 2001    (JP)  ............................. 2001-334074

(51) Int. Cl.
*H04L 12/56*    (2006.01)
*H04J 3/16*    (2006.01)

(52) U.S. Cl. ................................. 370/395.52; 370/466

(58) Field of Classification Search ........... 370/395.21, 370/395.52
See application file for complete search history.

(56) References Cited

U.S. PATENT DOCUMENTS

| 6,385,170 B1* | 5/2002 | Chiu et al. ................... 370/235 |
| 6,496,479 B1* | 12/2002 | Shionozaki ................... 370/230 |
| 2001/0005381 A1* | 6/2001 | Sugiyama .................... 370/466 |
| 2001/0007560 A1* | 7/2001 | Masuda et al. .............. 370/401 |
| 2002/0097463 A1* | 7/2002 | Saunders et al. ........... 359/124 |
| 2003/0172160 A9* | 9/2003 | Widegren et al. ........... 709/226 |
| 2004/0213242 A1* | 10/2004 | Ando et al. ............... 370/395.1 |

\* cited by examiner

*Primary Examiner*—Seema S. Rao
*Assistant Examiner*—Gregory B. Sefcheck
(74) *Attorney, Agent, or Firm*—Katten Muchin Rosenman LLP

(57) ABSTRACT

A communication system is proposed which efficiently performs an interface control of QoS of ATM and QoS of IP and improves the quality and reliability of a network. A QoS information setting part sets QoS information of IP in a packet and sets QoS information of ATM corresponding to the QoS information when an IP-based communication takes place between networks, and sets QoS information of ATM in a cell when an ATM-based communication takes place. An information sending part sends the packet of the cell. An information receiving part receives the packet or the cell. A QoS guaranteed communication part performs a communication control with QoS being guaranteed on the basis of the QoS information.

21 Claims, 9 Drawing Sheets

FIG. 3

COMMUNICATION SYSTEM INTERFACING CONTROL OF QUALITY OF SERVICE (QOS) OF ASYNCHRONOUS TRANSFER MODE (ATM) AND INTERNET PROTOCOL (IP)

BACKGROUND OF THE INVENTION (1) Field of the Invention

The present invention relates to communication systems, and more particularly, to a communication system that performs a communication control.

(2) Description of the Related Art

Amazing popularization of the Internet has stimulated very active information communications such as audio and image. Recently, business users such as companies have positively considered the introduction of IP-VPN (Internet Protocol Virtual Private Network) in order to reduce the communication cost and realize electronic commerce.

The concept of QoS (Quality of Service) is needed to realize the Internet such as a leased line in which the available band is ensured. However, the current condition of the Internet does not guarantee QoS in the network layer (that is, the current condition is the best effort).

Thus, two QoS guaranteed techniques have been proposed, one of which is Intserv (RFC2205), and the other is Diffserv (RFC2475). These techniques have been considered toward standardization in IETF (Internet Engineering Task Force). The IETF is an organization for standardizing Internet related techniques and is making up document groups such as various protocols (RFC: Request For Comments).

Intserv (Integrated Service) performs scheduling for each flow using a network router. The flow is a flow of packets having the same source address, destination address, source port number and destination port number. The scheduling is a process for determining the order of packets in packet processing.

Intserv is a way close to the connection type network, but requires the router to handle complex processing such as state management and scheduling on the flow basis. Therefore, as the network scale becomes larger, the load of the router increases. Thus, Intserv has a problem in scalability.

On the other hand, Diffserv (Differentiated service) does not perform the above-mentioned flow-basis control, but is aggregate flow-basis processing in which DSCP (Diffserv Code Point) in the packet header is designated, and the packets having the same DSCP are handled as the same QoS. It has been desired that Diffserv is practiced as a way with high scalability with respect to large-scale networks.

Recent communication networks have complexity and extremely large scales in order to provide various services. For example, a composite network layer structure has been employed in which an IP network is configured on an ATM network.

Also, techniques such as XDSL (x Digital Subscriber Line) or ATM-PON (Asynchronous Transfer Mode Passive Optical Network) have been practiced in the access section (from the user to the carrier station. In the access section, the band is guaranteed using QoS of the ATM.

Although QoS should be guaranteed in the end-to-end section, the conventional art guarantees the band only in part of the access section on the ATM basis in the above-mentioned communication network. Thus, the original effects of QOS are not brought about, and the communication quality and the reliability are thus degraded.

It is therefore necessary to efficiently perform the interface control of QoS between the Diffserv compliant node and the ATM node in communications via the network including IP and ATM and to guarantee end-to-end QoS and the network.

SUMMARY OF THE INVENTION

Taking the above into consideration, it is an object of the present invention to provide a communication system capable of efficiently performing an interface control of QoS of ATM and QoS of IP and improving the quality and reliability of the network.

The above object of the present invention is achieved by a communication system for performing a communication control. The communication system comprises a QoS information setting device including a QoS information setting part that sets QoS information of IP in a packet and sets QoS information of ATM corresponding to the QoS information when an IP-based communication takes place, and that sets QoS information of ATM in a cell when an ATM-based communication takes place and an information sending part that sends the packet or the cell; and a QoS communication device including an information receiving part receiving the packet or the cell, and a QoS guaranteed communication part performing a communication control with QoS being guaranteed based on the QoS information.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a view of a correspondence between DSCP and PHB;

DESCRIPTION OF THE PREFERRED EMBODIMENTS

Figure 1:
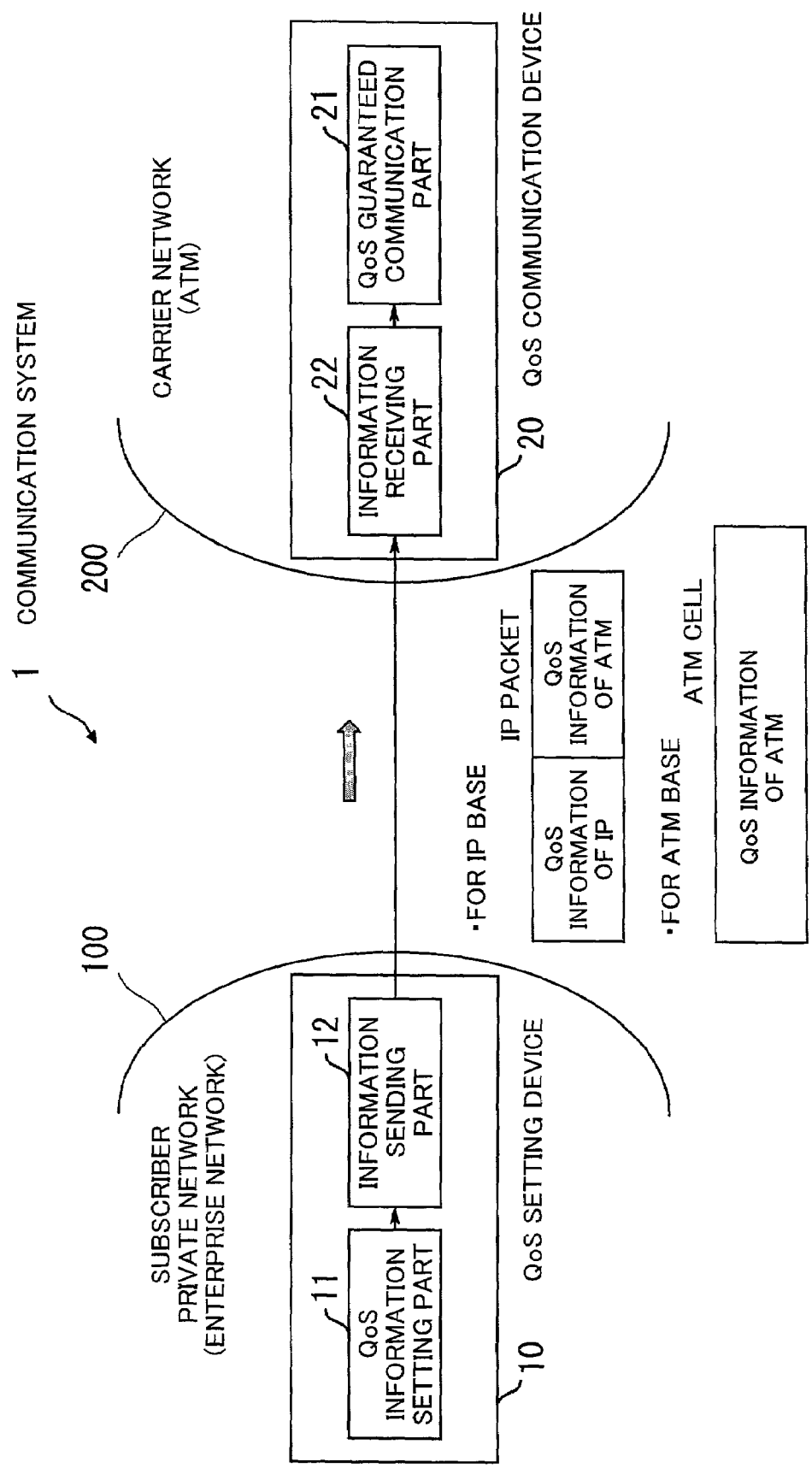
FIG. 1 is a diagram of the principles of a communication system of the present invention.

A description will now be given of embodiments of the present invention with reference to the accompanying drawings. FIG. 1 shows the principles of a communication system of the present invention. A communication system 1 includes a QoS setting device 10 and a QoS communication device 20, and performs a network communication control.

The following description is exemplarily directed to a case where the QoS setting device 10 is installed in a subscriber private network 100 and the QoS communication device 20 is installed in a carrier network 200 (which is an ATM network via which ATM communications take place). In practice, the functions of the QoS setting device 10 and the QoS communication device 20 may be implemented in a single communication device.

A QoS information setting part 11 of the QoS setting device 10 maps, in an IP packet, QoS information of IP and QoS information of ATM associated with the QoS information when an IP-based communication takes place between the subscriber private network 100 and the carrier network 200 and maps QoS information of ATM in an ATM cell when an ATM-based communication takes place between the subscriber private network 100 and the carrier network 200. An information sending part 12 sends an IP packet or an ATM cell with the QoS information being mapped.

An information receiving part 22 of the QoS communication device 20 receives the IP packet or ATM cell sent. A QoS guaranteed communication part 21 performs a QoS guaranteed communication control on the basis of the QoS information of ATM.

A description will now be given of a setting control of QoS information performed when an IP-based communication takes place between the subscriber private network 100 and the carrier network 200. A QoS information setting part 11 includes the Diffserv function and maps, as PHB (Per-Hop Behavior) corresponding to the value of DSCP (Diffserv Code Point), QoS information of IP in a DS (Differentiated Service) field of the IP packet at the time of setting QoS in IP communication.

Figure 2:
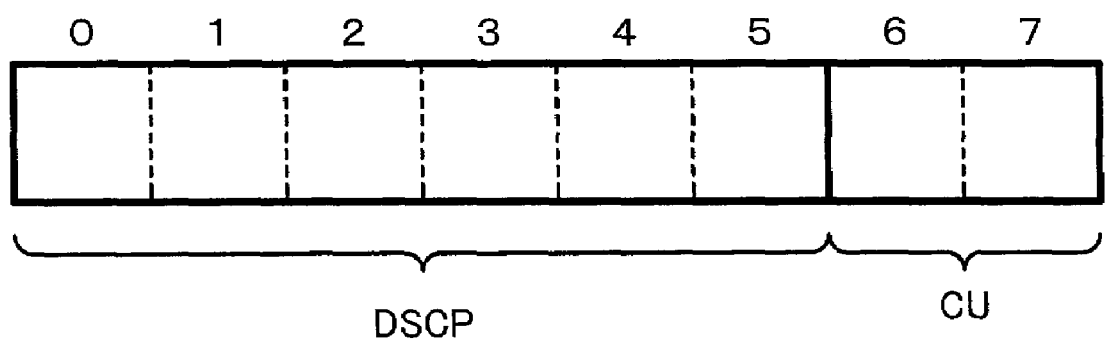
FIG. 2 is a view of a format of a DS field.

FIG. 2 shows a format of the DS field, which is defined in Ipv4 and Ipv6 (RFC2494).

The DS field consists of eight bits of 0–7. Bits 0–5 form a DSCP field (its recommended value is defined in the standard) in which QoS information of IP is set, and bits 6–7 form a CU (Currently Unused) field. According to the present invention, QoS information of ATM is set in the CU field.

Figure 3:
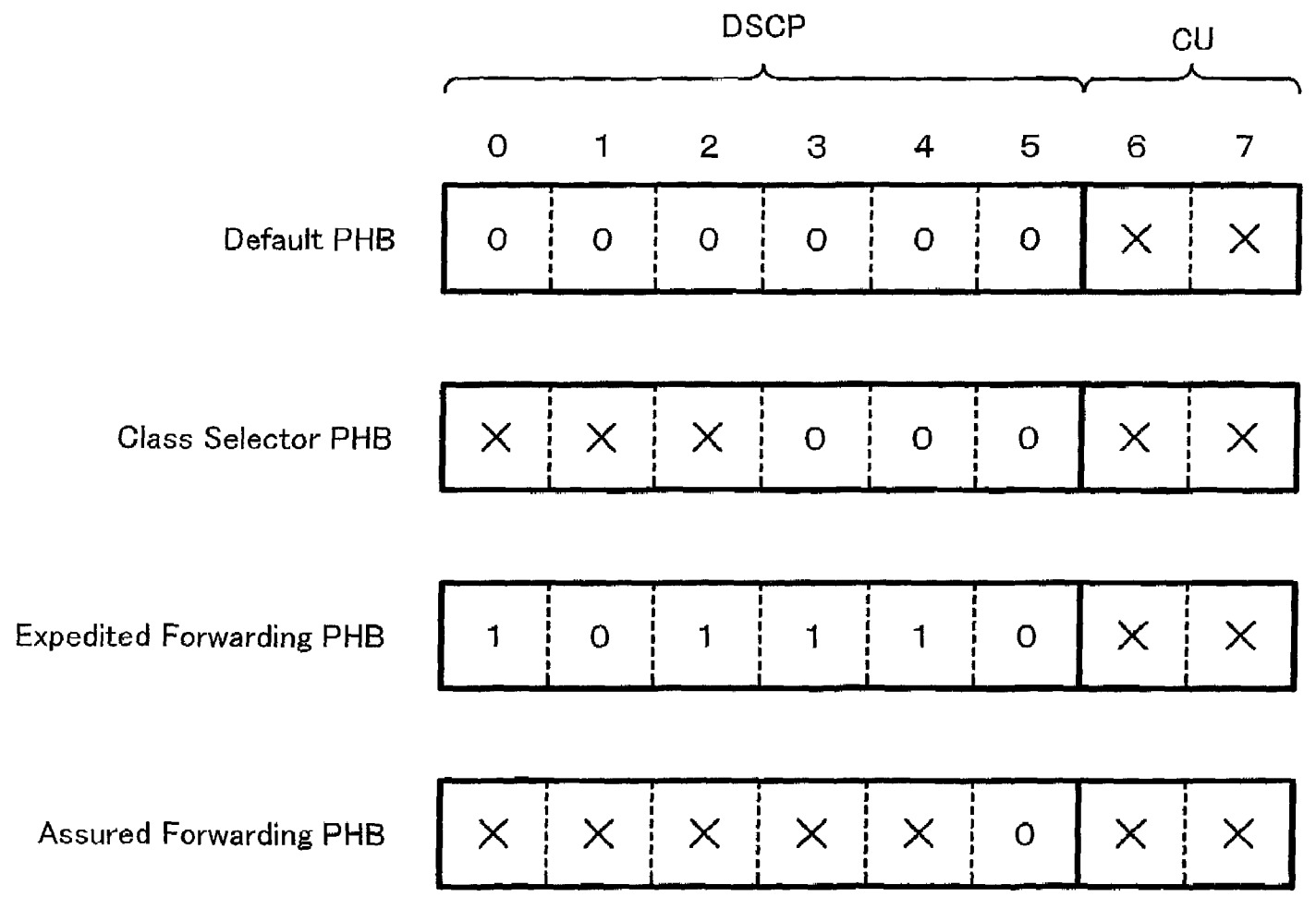

FIG. 3 shows a correspondence between DSCP and PHB. If bits 0–5 of DSCP are all "0", PHB is Default PHB. If bits 0–2 of DSCP are don't care and bits 3–5 are all "0", PHB is Class Selector PHB.

If bits 0 and 2–4 of DSCP are "1" and bits 1 and 5 are "0", PHB is Expedited Forwarding PHB (EF PHB). If bits 0–4 of DSCP are don't care and bit 5 is "0", PHB is Assured Forwarding PHB.

The Default PHB corresponds to UBR (Unspecified Bit Rate: best effort) in ATM, and Expedited Forwarding PHB corresponds to CBR (Constant Bit Rate: band guarantee type) in ATM. Class Selector PHB and Assured Forwarding PHB have a plurality of classes. There are many Class Selector PHB and Assured Forwarding PHB as a whole.

It is assumed that QoS information of ATM is configured so that "00" is set in bits 6 and 7 of CU as UBR and "01" is set as CBR.

When IP packets are sent to the carrier network 200 from the subscriber private network 100, UBR is set as QoS in such a manner that the QoS information setting part 11 sets DSCP to Default PHB and sets "00" in the CU field.

The IP packets thus set are sent by the information sending part 12, and are received by the information receiving part 22. Then, the QoS guaranteed communication part 21 looks up the CU field in the DS field of the IP packet, and determines that QoS of the packet is UBR. Then, the QoS guaranteed communication part 21 causes communications to take place at UBR in the carrier network 200. As descried above, QoS is determined by directly looking up the CU on the receiving side. Thus, there is no need to convert DSCP having an extremely large number of PHBs into Qos of ATM.

When IP packets are sent to the carrier network 200 from the subscriber private network 100, CBR is set as QoS in such a manner that the QoS information setting part 11 sets DSCP to Expedited Forwarding PHB and sets "01" in the CU field.

The IP packet thus set is sent by the information sending part 12, and are received by the information receiving part 22. Then, the QoS guaranteed communication part 21 looks up the CU field in the DS field of the IP packet, and determines that QoS of the packet is CBR. Then, the QoS guaranteed communication part 21 causes communications to take place at CBR in the carrier network 200.

Here, since the CU has two bits, if "10" is set in GFR (Guaranteed Frame rate) and "11" is set in Rt-VBR (Real Time-Variable Bit Rate) as QoS information of the remaining ATM, the settings can be made so as to correspond to QoS information of IP. GFR is a QoS class for designating the minimum frame rate on the VC/VP basis. Rt-VBR is a QoS class for real time communication.

In the above description, the DSCP value is the recommended value. Alternatively, the DSCP value may be arranged together with the bit values of QoS information of ATM (so as to be regenerated on the receiving side), and may be mapped in the eight bits of the DS field.

Figure 4:
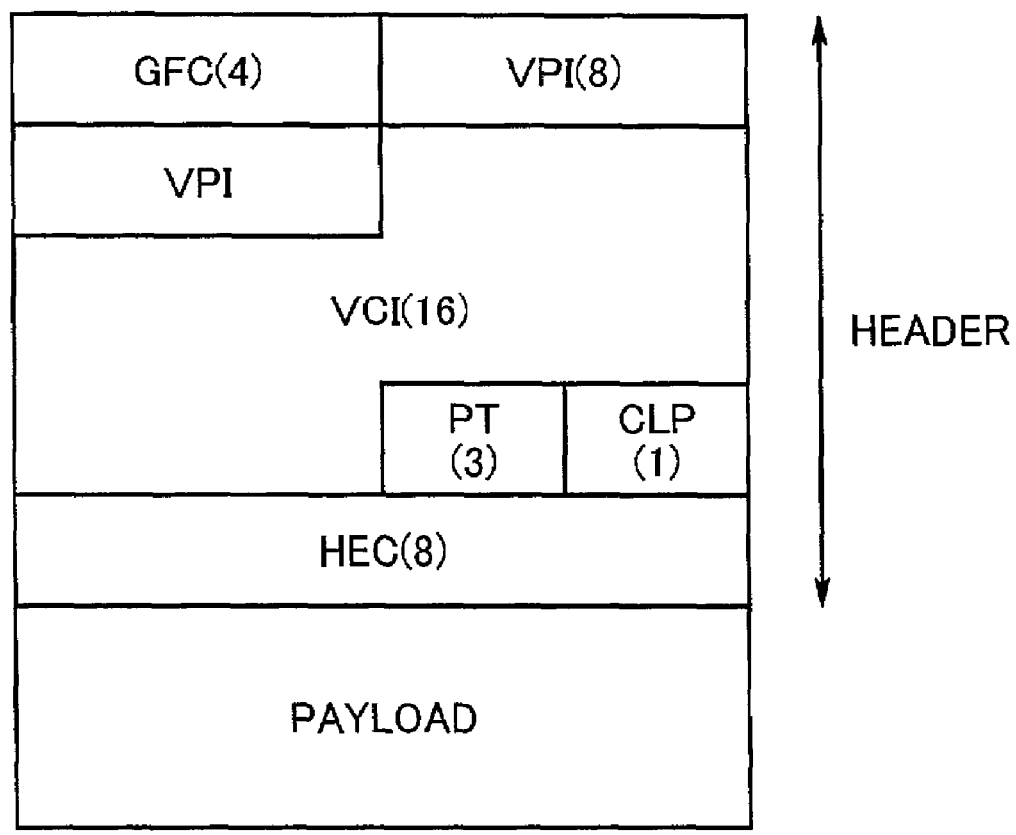
FIG. 4 is a view of a format of an ATM cell.

A description will now be given of a setting control of QoS information performed when the section between the subscriber private network 100 and the carrier network 200 is based on ATM. FIG. 4 shows a format of the ATM cell. The header of the ATM cell is configured as follows. GFC (Generic Flow Control) consisting of four bits is used to provide a local function such as discrimination among a plurality of stations that share a single ATM interface. Usually, GFC is not used but has the default value. In contrast, according to the present invention, QoS information of ATM is mapped in the GFC field.

VPI (Virtual Path Identifier) consisting of eight bits is used together with VCI and is used to identify the next destination each time a cell passes through the switch router until the cell reaches the final destination. VCI (Virtual Channel Identifier) of 16 bits is used together with VPI and is used to identify the next destination each time a cell passes through the switch router until the cell reaches the final destination.

PT (Payload Type) consists of three bits. The front bit of PT indicates whether user data or control data is included in the cell. In the case where user data is included in the cell, the second bit indicates congestion, and the third bit indicates the cell is whether the last cell of a series of cells representing one AAL5 (ATM adaptation layer 5: a cell division method that is mostly in widespread use at present) frame.

One-bit CLP (Congestion Loss Priority) indicates whether the cell should be discarded when the cell encounters heavy congestion during propagation on the network. HEC (Header Error Control) consisting of eight bits is the check sum computed in the header alone.

The QoS information setting part 11 maps QoS information of ATM in the GFC field of the ATM cell header (note that the GFC field is defined only for UNI). Since the GFC field consists of four bits, 16 different QoS classes of ATM can be discriminated.

As described above, the ATM cell with QoS set in GFC is sent by the information sending part 12 and is received by the information receiving part 22. The QoS guaranteed communication part 21 looks up the GFC field of the ATM cell, and causes a communication based on the determination result to take place in the carrier network 200.

Here, in the conventional ATM (such as XDSL or ATM-PON), QoS for each connection is set by the network management apparatus such as EMS (Element Management System) in advance (a connectionless method using AAL3/4 is known but has not yet been placed in practice).

Thus, there is no way to transfer QoS information in the ATM layer (ATM header part) and AAL layer (AAL 5 trailer part). On the contrary, according to the present invention, QoS information is mapped in the GFC of the ATM header through the communication node. This enables efficient setting control of QoS information.

Next, a description will be given of a setting control of QOS information in the case where communications of an ATM-based signal take place between chips such as LSI or the like.

An interface called UTOPIA (Universal Tests & Operations Interface for ATM) is defined for communications of an ATM-based signal between chips. UTOPIA is an interface between the ATM layer and the physical layer defined by the ATM Forum, and is used as an interface within an LSI and that between an LSI and a board. The above interface makes it possible to mutually connect LSI chips between different vendors.

Figure 5:
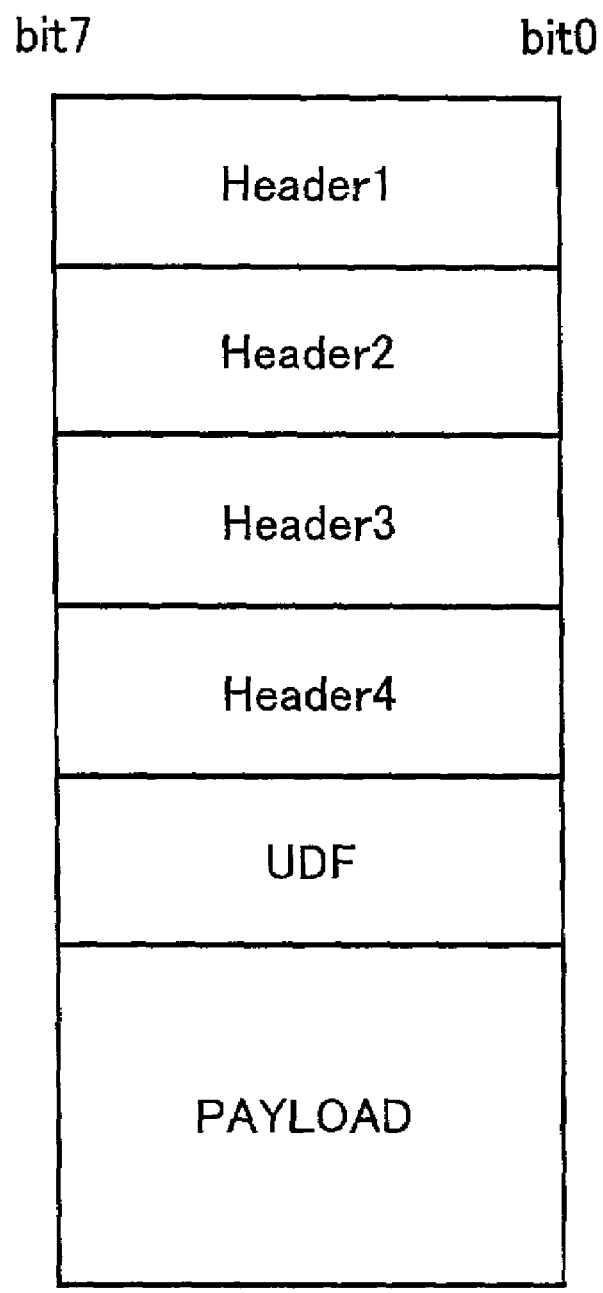
FIG. 5 is a view of a UTOPIA cell format.
Figure 6:
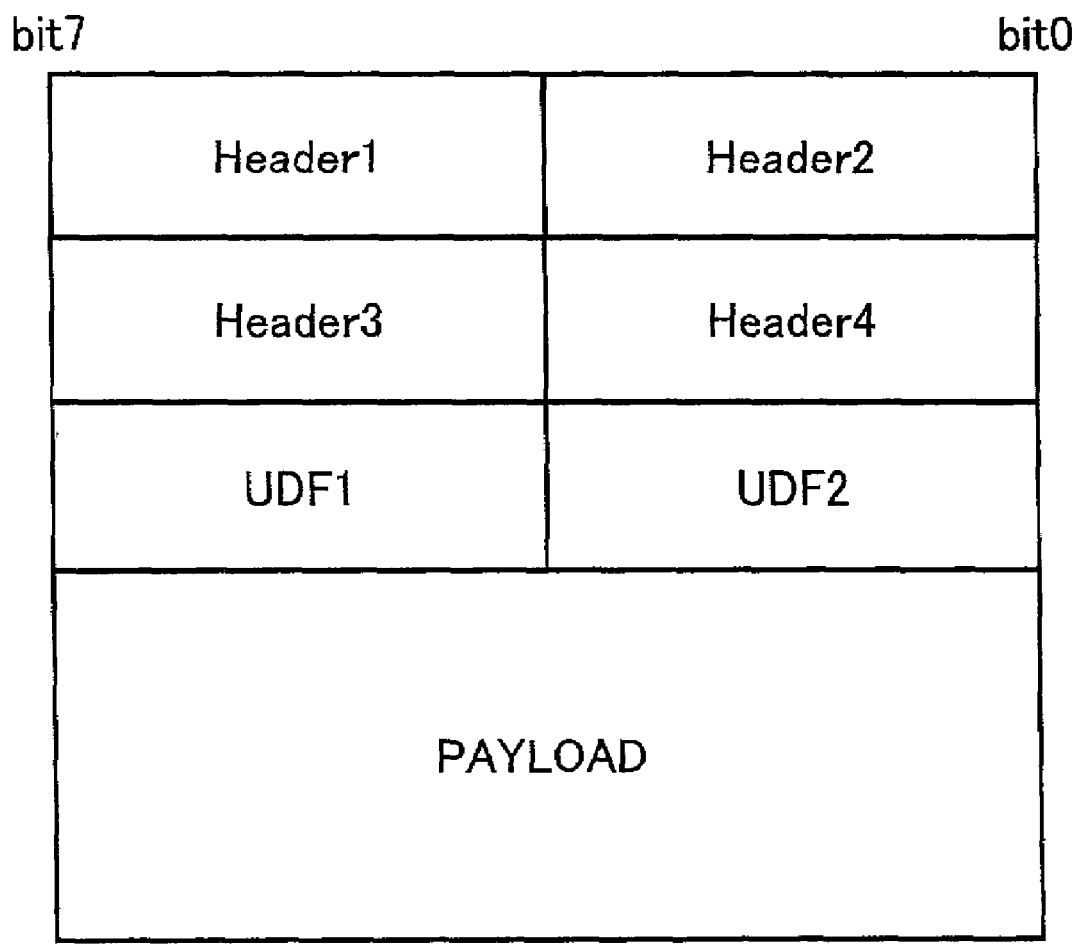
FIG. 6 is a view of a UTOPIA cell format.

FIGS. 5 and 6 respectively show a UTOPIA cell format. More particularly, FIG. 5 is a cell format of UTOPIA level 1 (8-bit mode), and FIG. 6 is a cell format of UTOPIA level 2 (16-bit mode). The UTOPIA level 1 defines a format in a 1:1 chip connection, and the UTOPIA level 2 defines a format in a 1:N chip connection.

The QoS information setting part 11 maps the QoS information of ATM in the UDF (User Defined) field of the UTOPIA cell header. The cell with the QoS set in the UDF is sent by the information sending part 12, and is received by the information receiving part 22. The QoS guaranteed communication part 21 looks up the UDF field of the cell, and determines QoS of the cell. Then, a communication based on the determination results takes place.

Figure 7:
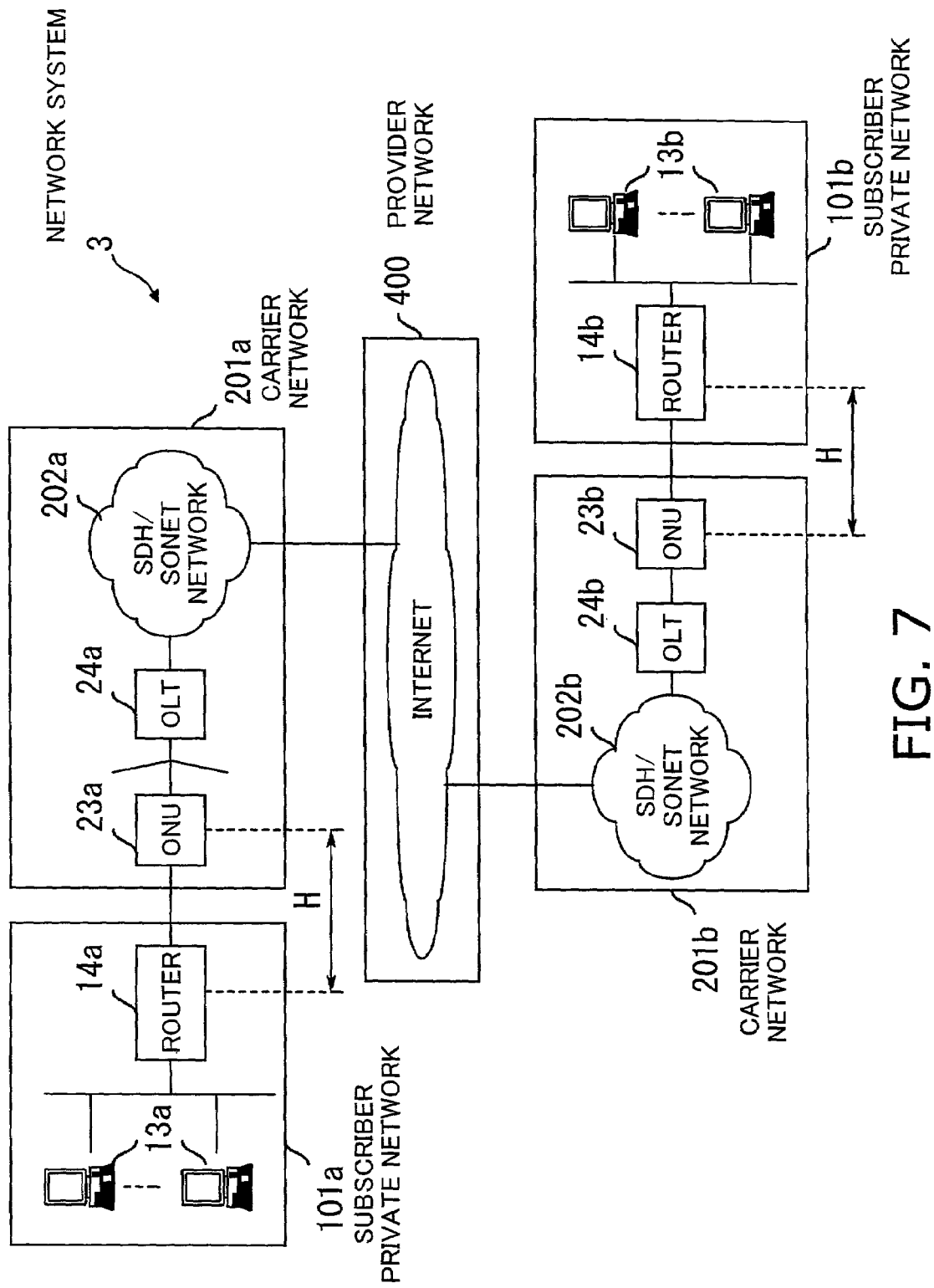
FIG. 7 is a diagram of a network system.

A description will now be given of a concrete network system to which the communication system of the present invention is applied. FIG. 7 is a diagram of the network system.

The network system 3 is made up of three network segments that consist of subscriber private networks 101a and 101b, carrier networks 201a and 201b, and a provider network 400.

The subscriber private network 101a includes a terminal 13a and a router 14a, and the subscriber private network 101b includes a terminal 13b and a router 14b. The carrier network 201a includes an ONU (Optical Network Unit) 23a, an OLT (Optical Line Termination) 24a, and an SDH/SONET network 202a. The carrier network 201b includes an ONU 23b, an OLT 24b, and an SDH/SONET network 202b. The provider network 400 includes the Internet. In the following description, the lower cases attached to the numeral numbers will be omitted when the above terms are used generically.

The subscriber private networks 101 are company networks, each including a plurality of terminals (such as personal computers) 13 and a router (subscriber side edge device) 14. The networks illustrated in FIG. 7 are bus-type LANs.

The carrier networks 201 are equipped with ATM-PON devices as access sections. As the ATM-PON devices, the ONUs (ATM side edge devices) 23 are installed on the subscriber sides, and OLTs 24 are installed on the station sides of the carriers. As core sections, there are SDH/SONET networks 202, which are connected to the provider network 400 including the Internet.

The routers 14 have interfaces between the subscriber private networks 101 and the carrier networks 201, and function as edge devices, which make an adjustment so as not to exceed values defined in contracts with the carriers.

The terminals 13 support RSVP (Resource Reservation Protocol) signaling and Diffserv. The routers 14 have DACS (Diffserv Admission Control Service) that processes RSVP and Dffserv (acceptance control that prevents the value from exceeding the values defined in contracts with the carriers).

Generally, Diffserv does not need RSVP (generally, RSVP signaling is performed at the time of setting Intserv). However, supporting both the RSVP and Diffserv makes it possible to improve the efficiency of usage of resources in the Diffserv region and improve the reliability.

Next, a description will be given of an operation performed when section H between the router 14 and the ONU 23 is formed by 10/100Base-T (IP-based communications) of Ethernet. The section H is an SLA (Service Level Agreement) in which a contract about the network quality, performance and fees is made between the subscriber and the carrier.

The subscriber (company) makes a contract with the carrier in advance (for example, CBR of 6 Mbps is agreed). A contract with ISP is dynamically made on the application basis.

First, a case will be considered where image data (MPEG) is transferred from the terminal 13a at 6 Mbps. The terminal 13a performs RSVP signaling first. After acknowledging the guaranteed band sufficient to transfer the data according to the contract, the router 14a transfers RSVP signaling to the carrier network 201a.

The data of RSVP signaling itself is transferred at UBR on the ATM network (carrier network 201a). After the carrier network 201a and the provider network 400 receive the RSVP signaling, RSVP Resv is sent back to the terminal 13a.

The terminal 13a receives RSVP Resv, and recognizes that the band has been appointed. Then, the terminal 13a transfers image data using IP. At that time, the terminal 13a maps DSCP value "101110" corresponding to EF PHB in the DS field of the IP header, and transfers the image data.

The router 14a receives the IP packet from the terminal 13a, and checks whether the contracted value has been observed by RSVP signaling. Further, the router 14a maps the value (for example, "00") corresponding to QoS class (CBR) of ATM in the CU field based on the value of DSCP, and transfers the data to the carrier network 201a.

The ONU 23a, which is an edge device of the carrier network 201a, has a UPC (Usage Parameter Control) function, and monitors overrunning the contracted value. Further, the ONU 23a detects only the CU field in the header of the IP packet coming from the router 14a, and thus recognizes QoS of ATM.

The UPC is the function of protecting network resources from vicious or unintentional behaviors that may affect the service quality of other connections already set by detecting the value that is disobedient to the contracted parameter value.

The ONU23a that has recognized QoS of ATM stores the received packet in a buffer queue of CBR. The OLT 24a is notified of the buffered information, and issues a message (grant) indicating allowance of transfer of an upstream cell against the ONU 23a. The ONU 23a transfers the IP packet on the ATM-PON interface on the basis of QoS. The IP packet information is transferred to the provider network 400 from the OLT 24a via the SDH/SONET network 202a.

The above-mentioned QoS setting control of the present invention makes it possible to guarantee QoS in the end-to-end section and to efficiently realize DBA (Dynamic Bandwidth Allocation) on the ATM-PON.

The above description is directed to the case where the section H between the router 14a and ONU 23a is connected by IP-based communications. In a case where the section H is connected by ATM-based communications such as ATM25/155, the terminal 13a maps QoS information in the GFC field of the ATM header for transmission of ATM cell. Thus, end-to-end communications with QoS guaranteed take place.

In the carrier network 201a, the VP connection may be set in advance for each ATM QoS based on the contracts with the respective subscribers. With respect to the IP data flow for each application, the DS field of the IP packet or the GFC field of the ATM cell is read and VPI and VCI are assigned thereto for distribution. In this manner, data is transferred via the carrier networks 201.

Further, in the above description, at the time of RSVP signaling of the terminal 13a, the receiving control is conducted via the carrier network 201a or the provider network 400, but it is not limitative. The router 14a may have RSVP signaling process function.

This avoids meaningless RSVP signaling and transfer of the IP data flow that is acknowledged as being discarded at the inlet of the carrier network 201a. Thus, effective working can be done.

By designing the router 14a to have the RSVP signaling process function, RSVP signaling is performed by the terminal 13a and the router 14a within the subscriber private network 110a. Thereafter, the router 14a determines whether the flow may be transferred to the carrier network 201a by referring to the available band capacity.

For the flow that cannot be transferred, a transfer to the terminal 13a is rejected by an RSVP PathErr message. The flow that can be transferred is transferred to the carrier network 201a.

For instance, a case is considered where audio, video and data are transferred. In this case, a problem about transfer of audio and video may arise from the use of only UBR, another problem about the efficiency of use may arise from the use of only CBR.

Thus, it is assumed that a contract with the carrier is made in the combination of UBR and CBR in which UBR is used for data transfer, and CBR is used for transfer of audio and video. However, if the bandwidth of CBR is available, this bandwidth is preferably used for data transfer.

Thus, the router 14a selects QoS parameters optimal to the respective applications from among the QoS parameters of ATM that have been contracted with the carrier, and dynamically sets QoS information of ATM on the basis of the state of the band. This enables flexible switching between UBR and CBR.

Figure 8:
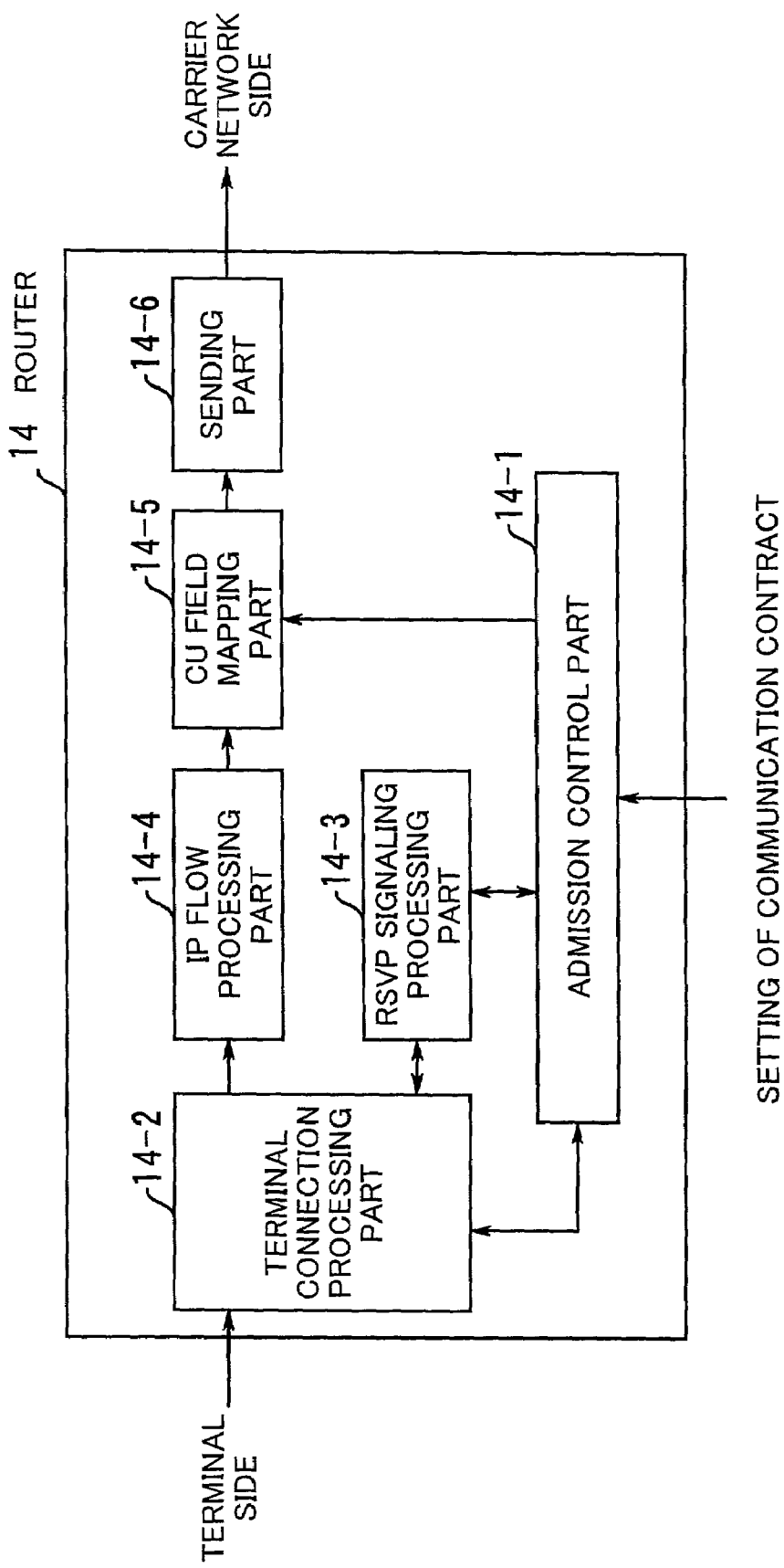
FIG. 8 is a diagram of a structure of a router.

A description will now be given of a structure of the routers 14, more particularly, only the functional parts involved in the flow from the terminals 13 to the carrier networks 201 and related to the present invention. FIG. 8 shows a structure of the router 14. The router 14 includes an admission control part 14-1, a terminal connection processing part 14-2, an RSVP signaling processing part 14-3, an IP flow processing part 14-4, a CU field mapping part 14-5, and a sending part 14-6.

Information about communications contracts is externally set in the admission control part 14-1. The admission control part 14-1 sets parameters based on the information about communications contracts in the related structural parts in the router 14 and makes a decision as to whether a communication can take place by referring to received data and information about the communications contracts.

The terminal connection processing part 14-2 makes a connection with the terminal 13, and determines whether received information data is RSVP signaling data or normal data by referring to the content of the header thereof.

The RSVP signaling processing part 14-3 performs a signaling process for an exchange of information about resources for a communication. The IP flow processing part 14-4 buffers normal data. The CU field mapping part 14-5 maps QoS information of ATM in the CU field. The sending part 14-6 sends information with QoS information being mapped therein to the carrier network 201.

Figure 9:
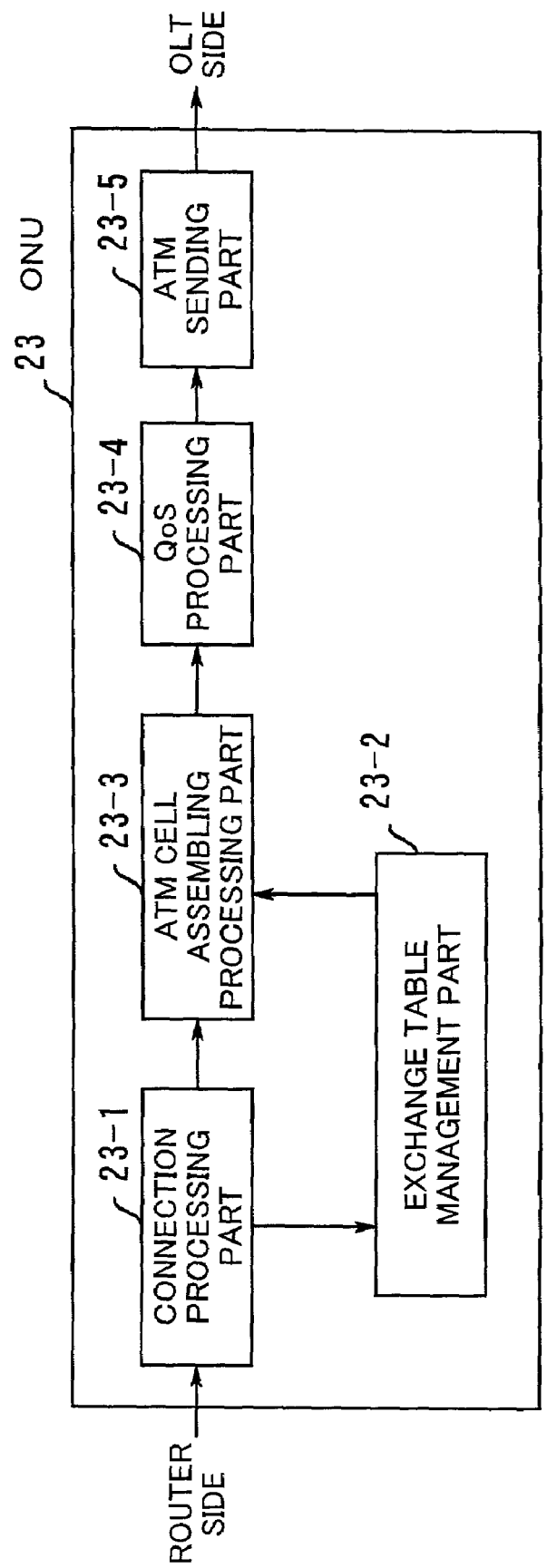
FIG. 9 is a diagram of a structure of an ONU.

A description will now be given of a structure of the ONUs 23, more particularly, only the functional parts involved in the flow from the routers 14 to the OLTs 24 and related to the present invention. FIG. 9 shows a structure of the ONU 23, which is made up of a connection processing part 23-1, an exchange table management part 23-2, an ATM cell assembling processing part 23-3, a QoS processing part 23-4, and an ATM sending part 23-5.

The connection processing part 23-1 makes a connection with the router 14, and sends header information to the exchange table management part 23-2. The exchange table management part 23-2 is used for an address exchange from the IP address to VPI/VCI and a QoS exchange from the CU field to QoS of ATM.

The ATM cell assembling processing part 23-3 assembles the received information data into an ATM cell on the basis of the information exchanged by the exchange table management part 23-2. The QoS processing part 23-4 performs a queuing process of ATM cells. The ATM sending part 23-5 sends the ATM cell to the OLT 24.

As described above, the edge device (not limited to the router) configured as shown in FIG. 8 is disposed at the outlet edge of the subscriber private network, and the edge device (not limited to ONU) configured as shown in FIG. 9 is disposed at the inlet edge of the carrier network. With the above arrangement, it is possible to efficiently perform the interface control of QoS information.

According to the present invention, it is possible to accommodate QoS by Diffserv on ATM and guarantee QoS of IP by executing the aggregate flow process by Diffserv on ATM.

It is enough for the subscribers to make contracts of simple and static SLA with the carrier. Further, the subscribers can make dynamic SLA with ISP by transparently passing Diffserv via the ATM network.

As described above, the communication system of the present invention sets QoS information of IP and QoS information of ATM in a packet when an IP-based communication takes place between networks, and sets QoS information of ATM in a cell when an ATM-based communication takes place. Then, QOS guaranteed communication control is performed on the basis of the QoS information. Thus, it is possible to efficiently perform the interface control of QoS of IP and QoS of ATM and guarantee QoS in the end-to-end section and improve the network quality and reliability.

The foregoing is considered as illustrative only the principles of the present invention. Further, since numerous modifications and changes will readily occur to those skilled in the art, it is not desired to limit the invention to the extract construction and applications shown and described, and accordingly, all suitable modifications and equivalents may be regarded as falling within the scope of the invention in the appended claims and their equivalents.

What is claimed is:

1. A communication system for performing a communication control comprising:
   a QoS setting device including a QoS information setting part that sets QoS information of IP in a packet and sets QoS information of ATM corresponding to the QoS information when an IP-based communication takes place, and that sets QoS information of ATM in a cell when an ATM-based communication takes place and an information sending part that sends the packet or the cell; and a QoS communication device including an information receiving part receiving the packet or the cell, and a QoS guaranteed communication part performing a communication control with QoS being guaranteed on the basis of the QoS information;

wherein the QoS information setting part sets the QoS information of IP in a Differentiated Service (DS) field of a packet and sets the QoS information of ATM in a Currently Unused (CU) field in the DS field.

2. The communication system according to claim 1, wherein the QoS information setting part sets a Diffserv Code Point (DSCP) value corresponding to each Per-Hop Behavior (PHS) when the IP-based communication takes place between networks.

3. The communication system according to claim 1, wherein the QoS information setting part sets the QoS information of ATM in a Generic Control Field (GFC) field of the cell when the ATM-based communication takes place between networks.

4. The communication system according to claim 1, wherein the QoS information setting part sets the QoS information of ATM in a User Defined Field (UDF) field in a UTOPIA interface cell when the ATM-based communication takes place between chips.

5. The communication system according to claim 1, wherein the QoS guaranteed communication part establishes a path and a connection for each QoS in advance and adds identifiers thereto on The basis of received QoS information for information transfer.

6. The communication system according to claim 1, wherein the QoS setting device recognizes optimal QoS to an application of a user terminal after signaling with the user terminal so that the QoS information can be dynamically set.

7. A communication device for performing a communication control comprising:

a QoS information setting part that sets QoS information of one or a plurality of communication protocols with regard to one packet or cell;

a QoS guaranteed communication part that performs a QoS guaranteed communication control on the basis of the QoS information; and an information sending/receiving part that sends and receives the packet or the cell;

wherein the QoS information setting part sets the QoS information of IP in a DS field of a packet and sets the QoS information of ATM in a CU field in the DS field.

8. The communication device according to claim 7, wherein the QoS information setting part sets PHB corresponding to DSCP when an IP-based communication takes place between networks.

9. The communication device according to claim 7, wherein the QoS information setting pan sets the QoS information of ATM in a GFC field of the cell when an ATM-based communication takes place between networks.

10. The communication device according to claim 7, wherein the Qos information setting part sets die QoS information of ATM in a UDF field in a UTOPIA interface cell when an ATM-based communication takes place between chaps.

11. The communication device according to claim 7, wherein the QoS guaranteed communication part establishes a path and a connection for each Qos in advance and adds identifiers thereto on the basis of received QoS information for information transfer.

12. The communication device according to claim 7, wherein after signaling with an user terminal, optimal Qos to each application of the user terminal is recognized and the QoS information is dynamically set.

13. A network system for performing a communication control when an IP-based communication takes place between a subscriber network and an ATM network, the network system comprising:

terminal supporting Diffserv;

a subscriber-side edge device including a QoS information setting part recognizing QoS information of IP set in an IP packet sent by the terminal and setting QoS information of corresponding ATM in the IP packet, and a packet sending part sending the IP packet; and an ATM-side edge device including a packer receiving part receiving the IP packet, and at QoS guaranteed communication part that assembles an IP data flow into a cell and performs a QoS guaranteed communication control on the basis of QoS information of ATM so that the cell is sent to The ATM network;

wherein the QoS information setting part sets the QoS information of IP in a DS field of a packer and sets the QoS information of ATM in a CU field in the DS field.

14. The network system according to claim 13, wherein the QoS information setting part recognizes, as the QoS information of IP, PHB corresponding to DSCP set in a DS field of the IP packet.

15. The network system according to claim 13, wherein the QoS guaranteed communication part establishes a path and a connection for each QoS in advance and adds identifiers thereto on the basis of received QoS information for information transfer.

16. The network system according to damn 13, wherein the subscriber-side edge device recognizes optimal QoS to an application of the terminal after signaling with the terminal so that the QoS information can be dynamically set.

17. A subscriber-side edge device arranged at an outlet edge of a subscriber network for performing a communication control comprising:

a QoS information setting part recognizing QoS information of IP set in an IP packet sent by a terminal that supports Diffserv and setting QoS information of corresponding ATM in the IP packet; and a packer sending part sending the IP packet to an ATM network;

wherein the QoS information setting part sets the QoS information of IP in a DS field of a packet and sets the QoS information of ATM in a CU field in the DS field.

18. The subscriber-side edge device according to claim 17, wherein the QoS information setting part recognizes, as the QoS information of IP, PHB corresponding to DSCP set in a DS field of the IP packet.

19. The subscriber-side edge device according to claim 17, wherein after signaling with the terminal, optimal QoS to each application of the terminal is recognized and the QoS information is dynamically set.

20. An ATM-side edge device arranged at an inlet edge of an ATM network for performing a communication control comprising:

a packet receiving part receiving an IP packet with QoS information of ATM being set therein; and a QoS guaranteed communication part that assembles an IP data flow into a cell and performs a QoS guaranteed communication control so that the cell is sent to the ATM networks;

and a QoS information setting part which sets the QoS information of IP in a DS field of a packet and sets the QoS information of ATM in a CU field in the DS field.

21. The ATM-side edge device according to claim 20, wherein the QoS guaranteed communication part establishes a path and a connection for each QoS in advance and adds identifiers thereto on the basis of received QoS information for information transfer.

* * * * *